United States Patent [19]

Sakamoto et al.

[11] 4,310,234
[45] Jan. 12, 1982

[54] SUPPLEMENTARY AMOUNT OF DEVELOPING SOLUTION DETERMINING METHOD FOR A FILM DEVELOPER

[75] Inventors: Seiya Sakamoto, Kyoto; Isao Saito, Shiga; Makoto Hirosawa, Kyoto; Tetsuo Hohki, Ibaraki, all of Japan

[73] Assignee: Dainippon Screen Seizo Kabushiki Kaisha, Kyoto, Japan

[21] Appl. No.: 189,184

[22] Filed: Sep. 22, 1980

[30] Foreign Application Priority Data

Oct. 4, 1979 [JP] Japan .................................. 54-128809

[51] Int. Cl.$^3$ ........................... G03D 3/02; H04N 1/22
[52] U.S. Cl. ...................................... 354/298; 358/298
[58] Field of Search ..................... 354/297, 298, 324; 358/298

[56] References Cited

U.S. PATENT DOCUMENTS 4,257,072  3/1981  Sakamoto ........................... 358/298

OTHER PUBLICATIONS

Japanese Patent Laying-Open Specification, No. 51-88301, Jan. 29, 1975.

Primary Examiner—L. T. Hix
Assistant Examiner—Alan Mathews
Attorney, Agent, or Firm—John Cyril Malloy

[57] ABSTRACT

A method for determining a supplementary amount of a developing solution for use in a film developer, wherein values of width signals for controlling a halftone dot generator of a picture reproducing machine are counted up, while a reproduction picture is recorded on a photosensitive film by the halftone dot generator according to picture signals which are obtained by scanning an original picture photoelectrically, and wherein a supplementary amount of the developing solution is determined according to the counted-up total value of the width signals prior to the development of the photosensitive film.

6 Claims, 3 Drawing Figures

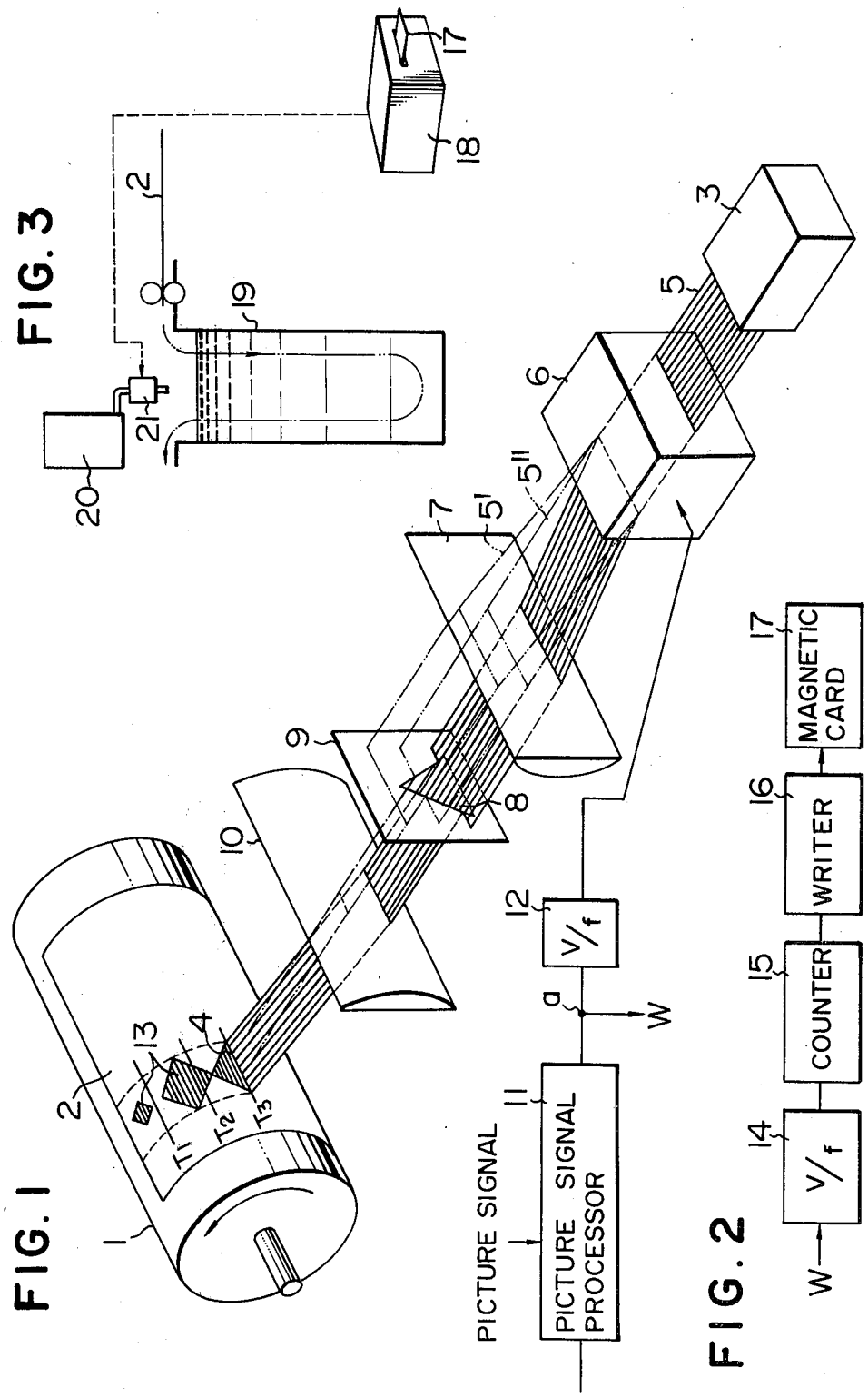

SUPPLEMENTARY AMOUNT OF DEVELOPING SOLUTION DETERMINING METHOD FOR A FILM DEVELOPER

BACKGROUND OF THE INVENTION

This invention relates to a method for determining a supplementary amount of a developing solution for use in a film developer.

In a conventional automatic film developer, in order to compensate insufficient development of a photographic film, which is caused by fatigue of a developing solution, the fresh developing solution is replenished during the developing operation. The proper amount of the fresh developing solution supplemented should be in proportion to the total amount of a blackened silver compound reacted on the film processed, which is, in case of a lithographic film, in proportion to the total area of blackening to be produced on the film.

However, this total area of blackening to be reacted is in proportion to not only the size of the film but also its blackening area rate which depends on each reproduction picture exposed on the film. Therefore, it is difficult to determine the total blackening area.

In a conventional automatic film developer, the blackening area rate is determined by the experiences obtained by an operator, and then according to the blackening area rate and the area of the film the supplementary amount of the fresh developing solution is determined, or the blackening area of the film developed is photoelectrically measured, and then according to the value measured the appropriate amount of the developing solution is determined, or a film strip exposed by a certain amount of light is continuously developed, and then according to the lowering of the density of the film developed the suitable amount of the fresh developing solution is replenished.

In these conventional methods, however, the first method is not always reliable, and the latter two methods require expensive apparatus and lack in a quick response property.

SUMMARY OF THE INVENTION

Therefore, it is an object of the present invention to provide a method for determining a supplementary amount of a developing solution for use in a film developer free from the aforementioned defects, which is reliable, quick and economic.

According to the present invention there is provided a method for determining a supplementary amount of a developing solution for use in a film developer, comprising the steps of counting up values of width signals for controlling a halftone dot generator of a picture reproducing machine, while a reproduction picture is recorded on a photosensitive film by the halftone dot generator according to picture signals which are obtained by scanning an original picture photoelectrically, and determining a supplementary amount of the developing solution according to the counted-up total value of the width signals prior to the development of the photosensitive film.

BRIEF DESCRIPTION OF DRAWINGS

In order that the present invention may be better understood, a preferred embodiment thereof will now be described with reference to the accompanying drawings, in which:

FIG. 1 is a schematic view of an optical system of a halftone dot generator of a conventional picture reproducing machine, for explaining a principle of a method according to the present invention;

FIG. 2 is a block diagram of a means which carries out a method according to the present invention; and FIG. 3 is a schematic view of part of a developer having a reader, which is controlled by a method according to the present invention.

DESCRIPTION OF A PREFERRED EMBODIMENT

Referring now to the drawings there is shown in FIG. 1 one embodiment of a halftone dot generator of a conventional picture reproducing machine, as disclosed in Japanese Patent Laying-Open Specification No. 51-88301 (Japanese patent application No. 50-11386), wherein an optical system of the halftone dot generator is enlarged as compared with the real size thereof, for the sake of the better understanding.

A recording cylinder 1 on which a recording film 2 is secured, is rotated in a direction indicated by an arrow by a motor (not shown). A light source 3 generates a flattened light beam 5 onto a scanning line or point 4 of the recording film 2 through an acoustooptical deflector 6, a first cylindrical lens 7, an aperture plate 9 having an isosceles triangle shape aperture 8, and a second cylindrical lens 10, which are arranged along a light axis.

A picture signal obtained by scanning an original picture mounted to a picture cylinder by means of a pickup head of a picture reproducing machine such as a color scanner (not shown), is supplied to a picture signal processor 11 wherein a width signal W which controls the acoustooptical deflector 6 of the halftone dot generator so that a deflection angle $\theta$ of the light beam 5 may be varied according to the density of the picture signal, is formed and is sent to a voltage-frequency converter 12, hereinafter referred to as a V/f converter, in order to be converted into the frequency variation. Then, the width signal as the frequency variation is fed to the acoustooptical deflector 6.

In the acoustooptical deflector 6, when the frequency of the width signal is low or high, the light beam 5 is deflected upwards or downwards, so that the height of the light beam 5 passing through the aperture 8 of the aperture plate 9 may be varied, thereby changing the width of the scanning line 4 of the light beam 5 projected onto the recording film 2. While the recording cylinder 1 is turned, by changing the width of the scanning line 4 desired halftone dots 13 are recorded on the film 2, as shown in FIG. 1.

For example, when the value of the width signal W is nought at a time $t_1$, the light beam 5 is deflected upwards by the acoustooptical deflector 6, as shown by imaginary lines 5' in FIG. 1, and is entirely intercepted by the aperture plate 9. Thus, no halftone dot is recorded on the film 2, as shown by a line $T_1$ in FIG. 1. When the value of the width signal W is about half of the maximum value at a time $t_2$, the light beam 5 is deflected by the acoustooptical deflector 6, as shown by imaginary lines 5'' in FIG. 1, and the middle half of the light beam 5 is passed through the aperture 8 of the aperture plate 9. Hence, the half of the maximum light beam width of the halftone dot is recorded on the film 2, as shown by a line $T_2$ in FIG. 1. Further, when the value of the width signal W is almost the maximum at another time $t_3$, the light beam 5 is deflected downwards, as shown by solid lines in FIG. 1, and most of the light beam 5 is passed through the aperture 8 of the aperture plate 9. Accordingly, most of the maximum light beam width of the halftone dot is recorded on the film 2, as shown by a line $T_3$ in FIG. 1.

From the above description it is readily understood that the value of the width signal W which controls the acoustooptical deflector of the halftone dot generator, corresponds to the width of the halftone dot, which is recorded on the film 2 at a certain time by the halftone dot generator. Therefore, the total value of the width signals W from the start to the end of the scanning operation of the film 2 corresponds to the total exposure area of the film 2, and, in case of the lighographic film, to the total blackening area of the film 2.

According to the present invention the information of the total exposure area or the total blackening area is to be recorded in a recording medium such as a magnetic card, a magnetic tape, a punch card, a punch tape, or the like.

In FIG. 2 is shown a block diagram of a means which carries out a method according to the present invention. The width signal W picked up from a point a positioned between the picture signal processor 11 and the V/f converter 12 is fed to a V/f converter 14 and converted there into a frequency variation which is counted by a counter 15 followed. The counter 15 counts up integrally the values of the width signals as the frequency variations from the start to the end of the scanning operation of the film 2. Then, for example, the integrated value of the width signals, counted up in the counter 15, is recorded in a magnetic card 17 by a writer 16. The film 2 exposed is accompanied with the magnetic card 17 recorded.

In FIG. 3 there is shown a part of a developer having a reader 18 which reads out the information for the supplementary amount of the developing solution from the magnetic card 17, a developing solution vessel 19, a developing solution supply tank 20, and a meter 21 connected thereto.

When the film 2 exposed is to be developed, the magnetic card 17 is settled to a reader 18, and the information for the supplementary amount of the developing solution is read out from the magnetic card 17 by the reader 18. The meter 21 is controlled in a conventional manner by the information read out of the magnetic card 17, so as to supplement the fresh developing solution from the developing solution supply tank 20 to the developing solution vessel 19 during the developing operation or prior to the developing operation.

According to the present invention, since the supplementary amount of the developing solution is determined according to the total value of the width signals, there are obtained the following advantages.

(1) Correctness

The integrated value of the width signals corresponds to the total exposure area of the photographic film, and, in case of the lithographic film, to the total blackening area, and therefore the supplementary amount of the developing solution is correctly known according to the method of the present invention.

(2) Rapidity

The desired supplementary amount of the developing solution is determined prior to the development of the film, and thus, when the film is developed, the rapid response is possible.

(3) Economy

In practice, a conventional picture reproducing machine having a halftone dot generator is utilized, which means economy, and further there is no need to measure the size of the film, and so forth.

Although the present invention has been shown and described in terms of a preferred embodiment illustrated in the accompanying drawings, however, various changes and modifications can be made by those skilled in the art without departing from the scope of the present invention.

For example, the total value of the width signals, which are counted up in the counter 15, may be sent directly to a supplementary amount setup means controlling the meter 21, without recording it in a recording medium. The width signal W as the frequency variation, which is passed through the V/f converter 12, may be fed directly to the counter 15 and is counted up there.

What is claimed is:

1. A method for determining a supplementary amount of a developing solution for use in a film developer, comprising the steps of:
    (a) counting up values of width signals for controlling a halftone dot generator of a picture reproducing machine, while a reproduction picture is recorded on a photosensitive film by the halftone dot generator according to picture signals which are obtained by scanning an original picture photoelectrically; and
    (b) determining a supplementary amount of the developing solution according to the counted-up total value of the width signals prior to the development of the photosensitive film.

2. A method as defined in claim 1, wherein the counted-up total value of the width signals is once recorded in a recording medium.

3. The method as set forth in claim 2 wherein said recording medium comprises a magnetic card.

4. The method as set forth in claim 2 wherein said recording medium comprises a magnetic tape.

5. The method as set forth in claim 2 wherein said medium comprises a punch card.

6. The method as set forth in claim 2 wherein said medium comprises a punch tape.

* * * * *